United States Patent
Kwatra et al.

(10) Patent No.: US 11,205,422 B2
(45) Date of Patent: Dec. 21, 2021

(54) METHODS AND SYSTEMS FOR MANAGING CHATBOTS WITH DATA ACCESS

(71) Applicant: INTERNATIONAL BUSINESS MACHINES CORPORATION, Armonk, NY (US)

(72) Inventors: Shikhar Kwatra, Durham, NC (US); Jeremy R. Fox, Georgetown, TX (US); Paul Krystek, Highland, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/150,158

(22) Filed: Oct. 2, 2018

(65) Prior Publication Data
US 2020/0105257 A1 Apr. 2, 2020

(51) Int. Cl.
*G10L 15/22* (2006.01)
*G10L 25/24* (2013.01)
*G06F 16/332* (2019.01)

(52) U.S. Cl.
CPC .......... *G10L 15/22* (2013.01); *G06F 16/3329* (2019.01); *G10L 25/24* (2013.01); *G10L 2015/225* (2013.01)

(58) Field of Classification Search
CPC ..... G06F 16/3329; G10L 15/22; G10L 25/24; G10L 2015/225; G10L 15/00; H04L 51/02
See application file for complete search history.

(56) References Cited

U.S. PATENT DOCUMENTS

| | | | |
|---|---|---|---|
| 7,069,560 B1* | 6/2006 | Cheyer | G06F 9/465 719/317 |
| 9,633,019 B2 | 4/2017 | Bostick | |
| 9,798,799 B2 | 10/2017 | Wolverton | |
| 9,959,129 B2 | 5/2018 | Kannan | |
| 2015/0213355 A1* | 7/2015 | Sharma | G06Q 30/0601 706/11 |
| 2016/0372113 A1* | 12/2016 | David | H04M 1/64 |
| 2017/0279906 A1* | 9/2017 | Laird-McConnell | H04L 67/22 |
| 2018/0032576 A1* | 2/2018 | Romero | G06N 3/006 |
| 2018/0090141 A1* | 3/2018 | Periorellis | G10L 15/1815 |
| 2018/0365444 A1* | 12/2018 | Barday | H04L 63/08 |
| 2019/0266287 A1* | 8/2019 | Chen | G06F 9/547 |

FOREIGN PATENT DOCUMENTS

WO 2017041008 A1 9/2016

OTHER PUBLICATIONS

Parthornratt et al ("Smart Home Automation via Facebook Chatbot and Raspberry Pi", 2018, 2nd International Conference on Engineering Innovation, pp. 52-56). (Year: 2018).*

(Continued)

*Primary Examiner* — Angela A Armstrong
(74) *Attorney, Agent, or Firm* — Griffiths & Seaton PLLC

(57) ABSTRACT

Embodiments for managing a chatbot by one or more processors are described. A communication from an individual is received. At least one data source associated with the individual is selected based on the received communication. A response to the received communication is generated based on the at least one selected data source.

12 Claims, 6 Drawing Sheets

(56) References Cited

OTHER PUBLICATIONS

Cui et al, ("SuperAgent: A Customer Service Chabot for E-commerce Websites", 2017, Proceedings of the 55th Annual Meeting of the Association for Computational Linguistics-System Demonstrations, pp. 97-102). (Year: 2017).*

Rohan Kar and Rishin Haldar, "Applying Chatbots to the Internet of Things: Opportunities and Architectural Elements" International Journal of Advanced Computer Science and Applications(ijacsa), 7(11), 2016. (Year: 2016).*

M. Muslih et al., "Developing Smart Workspace Based IOT with Artificial Intelligence Using Telegram Chatbot," 2018 International Conference on Computing, Engineering, and Design (ICCED), 2018, pp. 230-234. (Year: 2018).*

* cited by examiner

METHODS AND SYSTEMS FOR MANAGING CHATBOTS WITH DATA ACCESS

BACKGROUND OF THE INVENTION

Field of the Invention

The present invention relates in general to computing systems, and more particularly, to various embodiments for managing chatbots to improve the performance thereof via access to data sources.

Description of the Related Art

Chatbots, also known as talkbots, chatterbots, bots, instant messaging (IM) bots, interactive agents, Artificial Conversational Entities (ACEs), etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions, and the chatbot answers (or responds) based on its knowledge base and/or by analyzing the question, providing the best answer it can generate.

For example, users may be able to get answers and/or solutions associated with problems related to their activities and devices. However, in some scenarios, the user may not be able to effectively describe the problem, and the chatbot may not be able to provide the answer needed because of lack of understanding of the problem and/or lack of information provided by the user.

SUMMARY OF THE INVENTION

Various embodiments for managing chatbots by one or more processors are described. In one embodiment, by way of example only, a method for managing a chatbot, again by one or more processors, is provided. A communication from an individual is received. At least one data source associated with the individual is selected based on the received communication. A response to the received communication is generated based on the at least one selected data source.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
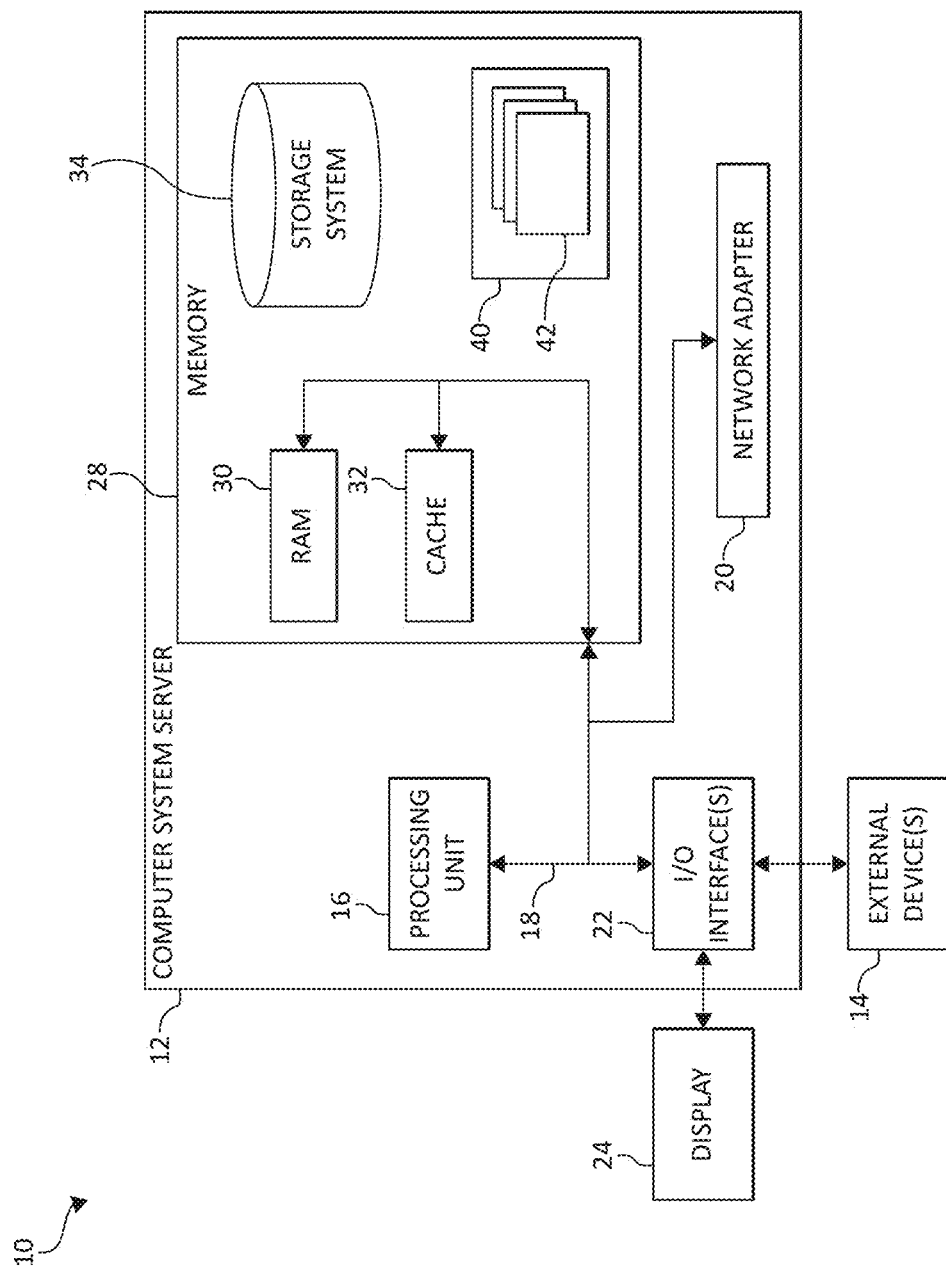
FIG. 1 is a block diagram depicting an exemplary computing node according to an embodiment of the present invention.

As discussed above, chatbots, also known as talkbots, chatterbots, bots, instant messaging (IM) bots, interactive agents, Artificial Conversational Entities (ACEs), etc., are computer nodes (i.e., devices and/or programs) or artificial intelligence modules which are able to conduct conversations with individuals (or users) through auditory (e.g., speech/voice) or text-based methods. Such programs are often designed to convincingly simulate how a human would behave as a conversational partner. As such, users may ask questions, and the chatbot answers (or responds) based on its knowledge base and/or by analyzing the question and providing the best answer it can generate.

For example, users may be able to get answers and/or solutions associated with problems related to their activities and devices. As one example, a user may ask why their mobile phone is consuming power from its battery at an unusually high rate. Based on user's question, the chatbot may answer the question in the best way possible or at least provide a generic response to a complex and/or difficult question. For instance, chatbot may simply suggest that the user changes their mobile phone to operate in a "battery saving" or "low power" mode and/or suggest closing all of the applications that are opened on the device but not being used.

As another example, consider a scenario in which a user asks why their air conditioner is not effectively cooling their house on that day. The chatbot may not be able to effectively answer the question without additional information (e.g., the chatbot may not understand why there is a problem and/or what actions may be taken to address the problem).

Thus, if the user is not able to effectively describe the problem and/or is not able to provide all of the information needed, the chatbot may not be able to provide the specific answer requested (or needed).

Thus, what is needed are methods and systems by which chatbots may connect directly to appropriate data sources (e.g., devices) and/or communicate with the user regarding critical additional information, identified by the chatbot (and/or an associated computing system), that is required to generate an optimal answer to the user.

To address these needs, some embodiments described herein provide methods and systems for managing a chatbot (and/or the operation thereof) in such a way that the chatbot communicates with data sources (e.g., computing devices, "internet of things" (IoT) devices, etc.) depending on the user's communication (e.g., a query, request, etc.) and collects additional information to facilitate providing or generating an optimal (or at least suitable) answer or response to the user.

In some embodiments, if while interacting with a chatbot, the user asks a question that is not very clear to the chatbot, the chatbot may analyze the question and request access to one or more devices (or data sources) associated with the user to, for example, identify the intended meaning of the question. This may allow the chatbot to identify or generate an appropriate and/or effective answer to the question. The devices accessed may be the device(s) referred to in the user's question (or command, request, statement, etc.) or other devices from which useful information may be collected, such as cameras and other sensors.

For example, a user may say something to the chatbot (e.g., via a microphone on their mobile phone) such as "My air conditioning unit seems to be having a problem—it is not cooling the house properly today." Based on this statement (or question), the chatbot may not be able to provide a sufficient answer without additional information (e.g., the chatbot can not understand why there is a problem and/or what actions/guidelines could be followed to address the problem). In such an instance, in some embodiments, the chatbot may ask the user to grant the chatbot (and/or an associated computing system) access to the user's home network server and/or home devices, such as the air conditioner (e.g., an IoT air conditioner). The user may then grant access (or provide authorization for the access) to at least some of the requested data sources (or devices), and the chatbot (and/or associated computing system) may analyze data retrieved from the data sources and provide an answer and/or request additional information from the user.

In some embodiments, the chatbot may specify what information (or data) or types of information may be collected from the devices. In such embodiments, the user may be able to selectively approve (or disapprove) of the information that is to be collected and/or utilized by the chatbot, while still providing at least some access to the device(s).

For example, with respect to the air conditioning example referred to above, when requesting access to the user's home network server and air conditioner, the chatbot may also specify that it needs (or request access to) information such as weather information, house size, voltage fluctuations, coolant quality, etc. The user may be able to selectively allow the chatbot to have access to the requested types of information (e.g., allow/grant access to weather information and house size but prevent access to voltage fluctuations and coolant quality).

In some embodiments, if the chatbot requests information from another computing device or system (e.g., a home network server), the other computing device may provide an indication of such to the user and/or request authorization from the user before providing the information to the chatbot and/or granting the chatbot access (e.g., via mobile phone, text messaging, etc.).

For example, while analyzing the activity log for a home network device (e.g., a home network server) from which the chatbot requests information, the chatbot may determine it would be useful to have access to information related to a second home network device (e.g., an air conditioning unit) to determine whether or not the second device is having a similar problem as the first device (e.g., during the same time frame). In such a situation, the user may consider the information related to the second device to be sensitive, as it may, for example, be indicative of the user's schedule and/or when they are not at home. As such, in some embodiments, the home network server (and/or the chatbot) may request authorization from the user (e.g., via a computing node, such as a mobile device). If the user does not authorize access to the second device, the information associated with the second device is not utilized, and the chatbot may generate an answer (or other response) to the extent possible given the available information. However, in some embodiments, if access to the information is considered to be critical (e.g., a safety concern), such may be indicated to the user, the chatbot may not provide any response, and/or access may be given to the second device automatically (e.g., overriding the lack of authorization from the user).

In some embodiments, a cognitive analysis may be used to perform the chatbot management described herein. In some embodiments, the cognitive analysis includes generating a cognitive profile for the user(s) based on, for example, data sources associated with the user(s). Data sources that be use used to generate a cognitive profile for the user(s) may include any appropriate data sources associated with the user that are accessible by the system (perhaps with the permission or authorization of the user). Examples of such data sources include, but are not limited to, computing systems/devices/nodes (e.g., IoT devices) associated with the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

The cognitive analysis may also include classifying natural language, analyzing tone, and analyzing sentiment (e.g., scanning for keywords, key phrases, etc.) with respect to, for example, communications sent to and/or received/detected by chatbots. In some embodiments, natural language processing (NLP), Mel-frequency cepstral coefficients (MFCCs), and/or region-based convolutional neural network (R-CNN) pixel mapping (e.g., for images/videos sent to chatbots), as are commonly understood, are used. Over time, the methods and systems described herein may determine correlations (or insights) between communications (e.g., voice and/or text-based communications) received by chatbots and data sources associated with the communications, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of chatbot operation as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing (or controlling) a chatbot (and/or the operation thereof) by one or more processors is described. A communication from an individual is received. At least one data source associated with the individual is selected based on the received communication. A response to the received communication is generated based on the at least one selected data source.

The generated response may be indicative of at least one of a request for authorization to access the at least one selected data source and a request for information associated with the received communication.

If the generated response is indicative of at least one of a request for authorization to access the at least one selected data source, an indication of an authorization from the individual to access the at least one selected data source may be received, the at least one selected data source may be analyzed based on the received communication, and a second response to the received communication may be generated based on the analysis of the at least one selected data source.

The received communication may be at least one of a voice communication or a text-based communication. At least one of the selecting of the at least one data source and the generating of the response may be performed utilizing an analysis of the received communication. The analysis may be performed utilizing at least one of natural language processing (NLP) and a Mel-frequency cepstral coefficient (MFCC) algorithm.

The received communication may include a query. The at least one selected data source may include at least one computing node associated with the individual.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a chatbot and/or in/through which a chatbot may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
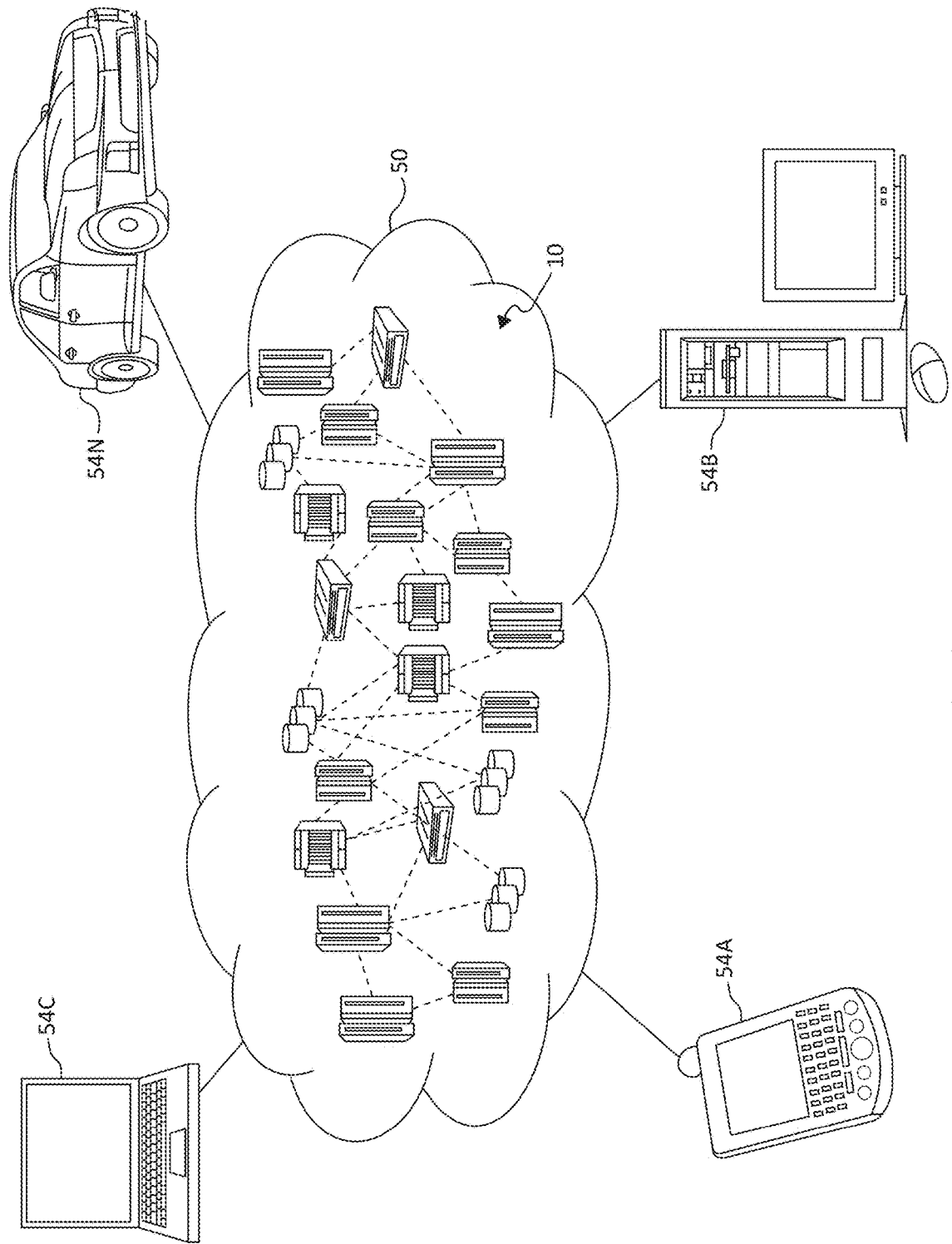
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
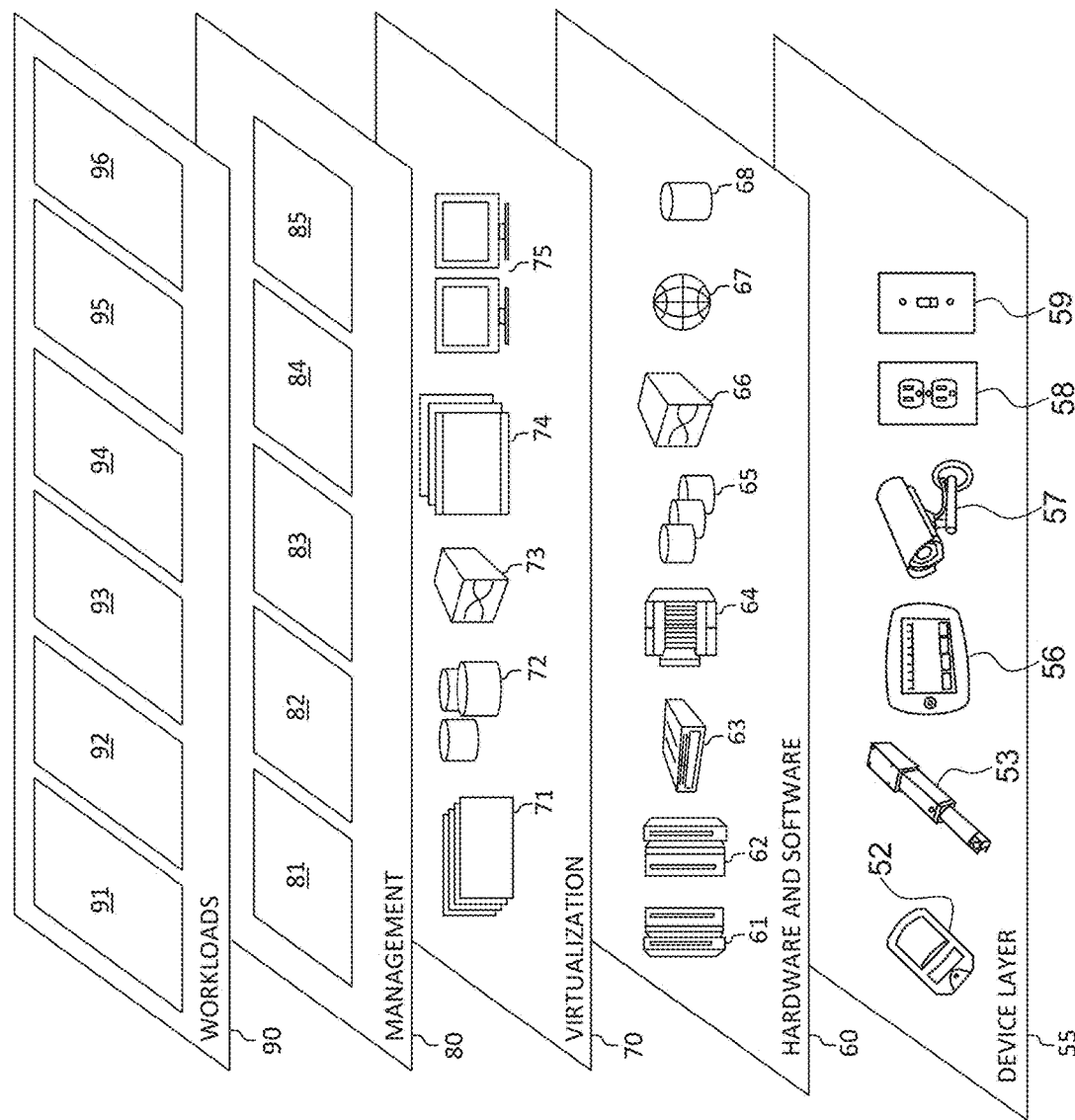
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing chatbots (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that, for example, manage a chatbot (or chatbots) and/or the operation thereof in such a way that the chatbot communicates with data sources (e.g., computing devices, IoT devices, etc.) depending on the user's communication (e.g., a query, request, etc.) and collects additional information to facilitate providing or generating an optimal or suitable answer or response to the user.

In some embodiments, if while interacting with a chatbot, the user asks a question (or sends another type of communication to the chatbot) that is not very clear to the chatbot, the chatbot may analyze the question and request access to one or more devices (or data sources) associated with the user to, for example, identify the intended meaning of the question (or statement, request, etc.). This may allow the chatbot to identify or generate an appropriate and/or effective answer to the question. The devices accessed may be the device(s) referred to in the user's question (or command, request, statement, etc.) or other devices from which useful information may be collected, such as cameras and other sensors.

In some embodiments, the chatbot may specify what information (or data) or types of information may be collected from the devices. In such embodiments, the user may be able to selectively approve (or disapprove) of the information that is to be collected and/or utilized by the chatbot, while still providing at least some access to the device(s).

In some embodiments, if the chatbot requests information from another computing device or system (e.g., a home network server), the other computing device may provide an indication of such to the user and/or request authorization from the user before providing the information to the chatbot and/or granting the chatbot access (e.g., via mobile phone, text messaging, etc.).

Figure 4:
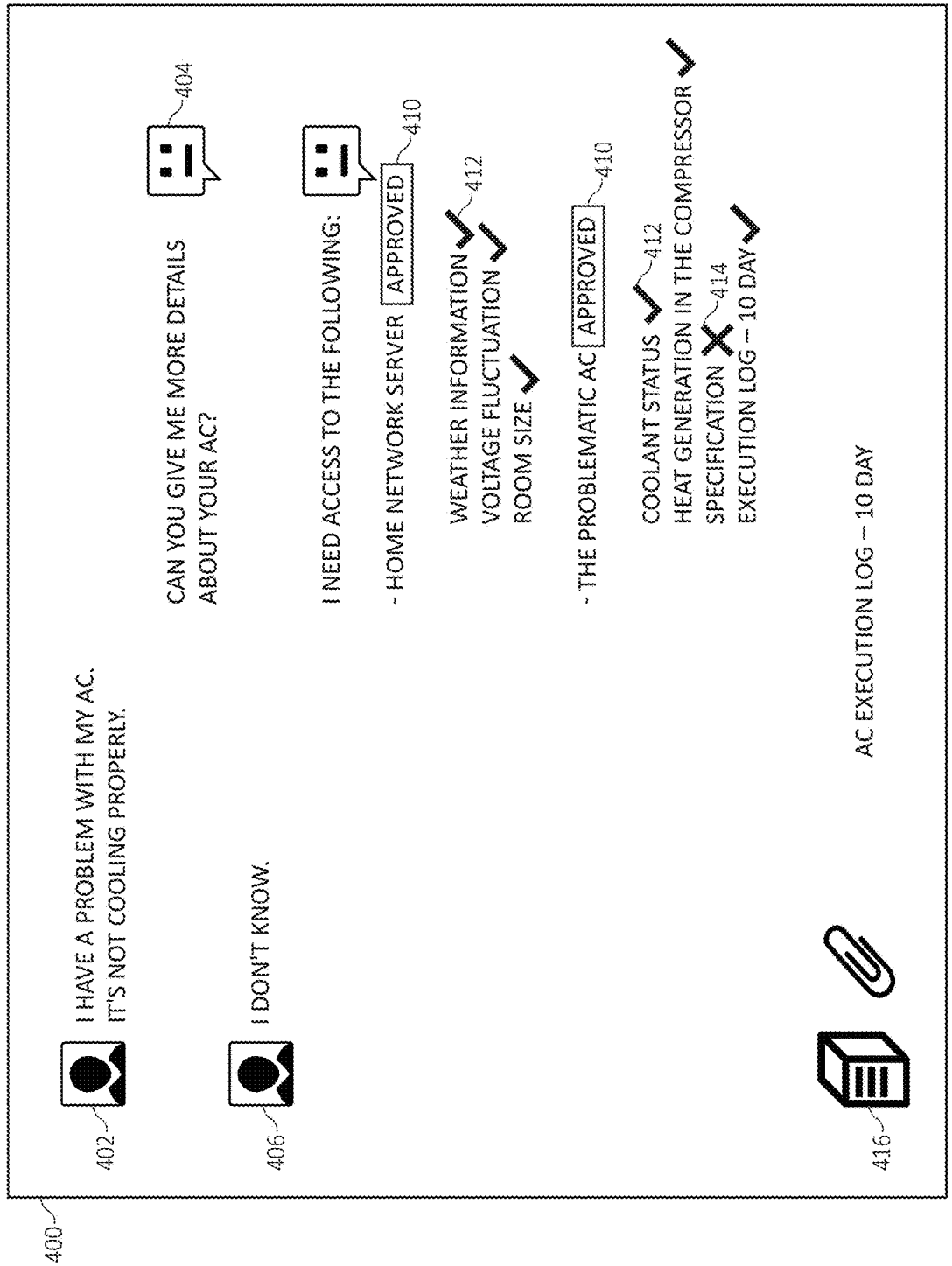
FIG. 4 is a plan view of a communication window showing an exemplary exchange of communications between a user and a chatbot according to an embodiment of the present invention.

FIG. 4 illustrates a communication window 400 showing an exemplary exchange of communications (or a conversation) between a user and a chatbot, according to some embodiments described herein. In embodiments in which the chatbot receives and/or generates text-based communications (or messages), the window 400, along with the various communications shown therein, may be displayed on a display device of any suitable computing node (e.g., a mobile phone, tablet device, etc.). However, in embodiments in which the chatbot receives and/or generates audible (e.g., voice/speech) communications, the window 400 may be understood to simply provide an illustrative representation of the exchange of communications and/or aspects of the functionality of at least some embodiments described herein.

In the depicted embodiment, the exchange of communications includes messages (or communications) 402-408, with the first/earliest messages being shown at the top of the window 400 (i.e., message 402 was generated/received first, and message 408 was generated/received last). As indicated, messages 402 and 406 were generated (or sent) by the user (or individual), and messages 404 and 408 were generated by the chatbot.

As shown, message 402 indicates that the user is having a problem with their air conditioner (AC) (or AC unit). The chatbot has analyzed (or analyzes) message 402 (e.g., via NLP, MFCCs, etc.) to determine that the message is related to the user's air conditioner and that the user does not believe the air conditioner is working properly. The chatbot (and/or an associated computing system) may attempt to generate a suitable answer or response to message 402 but determine it currently does not have sufficient information regarding the air conditioner. As such, the chatbot generates a reply message (or response) that is a request for additional information about the air conditioner. In the depicted embodiment, the user does not know such details, and thus generates message 406.

In response, the chatbot may, for example, analyze a profile associated with the user and determine that the user has (e.g., associated with their home) a home network server along with the air conditioning unit, both of which may include information that may assist the chatbot (or another computing system) in providing a suitable response to the user's initial message 402 (or query/question). As such, the chatbot generates message 408 that requests access (i.e., communicative access) to the home network server and the air conditioning unit, along with several specific types of information associated with (or stored on/by) each (e.g., detected/collected by various sensors associated with/utilized by the home network server and/or the air conditioning unit). In particular, in the depicted embodiment, the chatbot requests access to the home network server, along with weather information, voltage fluctuation, and room (or home) size which is (or may be) stored on a memory associated with the home network server, and the air conditioning unit, along with coolant status, heat generation in the compressor of the air conditioning unit, the specification (e.g., technical details about) the air conditioning unit, and a 10-day execution log for the air conditioning unit.

In some embodiments, the user is able to selectively provide authorization for access to each of the requested devices and/or associated types of information. For example, still referring to FIG. 4, each of the devices and the associated types of information is shown with an indicator of whether or not the user has provided authorization for the chatbot to access the associated device or information type. In particular, message 408 has been annotated with "approved" labels 410 next to "home network server" and "the problematic AC" and "checkmark" icons 412 and "X" icon(s) 414 next to the various types of information. That is, the user has provided an indication that they are providing the chatbot with authorization to access the home network server, along with the weather information, voltage fluctuation, and room size, and the air conditioning unit, along with the coolant status, heat generation, and 10-day execution log, but not the specification. Thus, in the depicted embodiment, the "approved" labels 410 and the checkmark icons 412 may indicate that the user has authorized the chatbot to access the associated device or information type, and the X icon may indicate that the user has not authorized the chatbot to access the associated device/information type (or has rejected such authorization).

In some embodiments, if the user does not provide authorization for the chatbot to access a device, a "rejected" or "denied" label or similar (not shown) may be used. Again, it should be noted that in some embodiments, the user interacts with the chatbot via audible messages, and in such embodiments, the various annotations (and/or the other message components) may not be displayed on a display device.

Still referring to FIG. 4, the annotations associated with message 408 and/or the corresponding authorizations/denials may be generated or indicated by the user in several ways. For example, in embodiments in which the user interacts with the chatbot via text-based communications displayed on a display screen, the user may toggle through the various types of annotations (and/or corresponding authorization statuses) by "clicking" each of the various devices and/or information types (e.g., with a cursor/mouse, keyboard, via touch screen, etc.) listed in the message (e.g., message 408). In embodiments in which the user interacts with the chatbot via audible communications, the user may provide voice/speech input that indicates their options regarding the authorization (or lack thereof) for the chatbot to access the various devices/information types. In the example shown in FIG. 4, also displayed in the window 400 is an indication 416 of a file transfer of the 10-day execution log of the air conditioner to the chatbot and/or the chatbot accessing the log (e.g., based on the user providing authorization for the chatbot to access the log, as described above).

Figure 5:
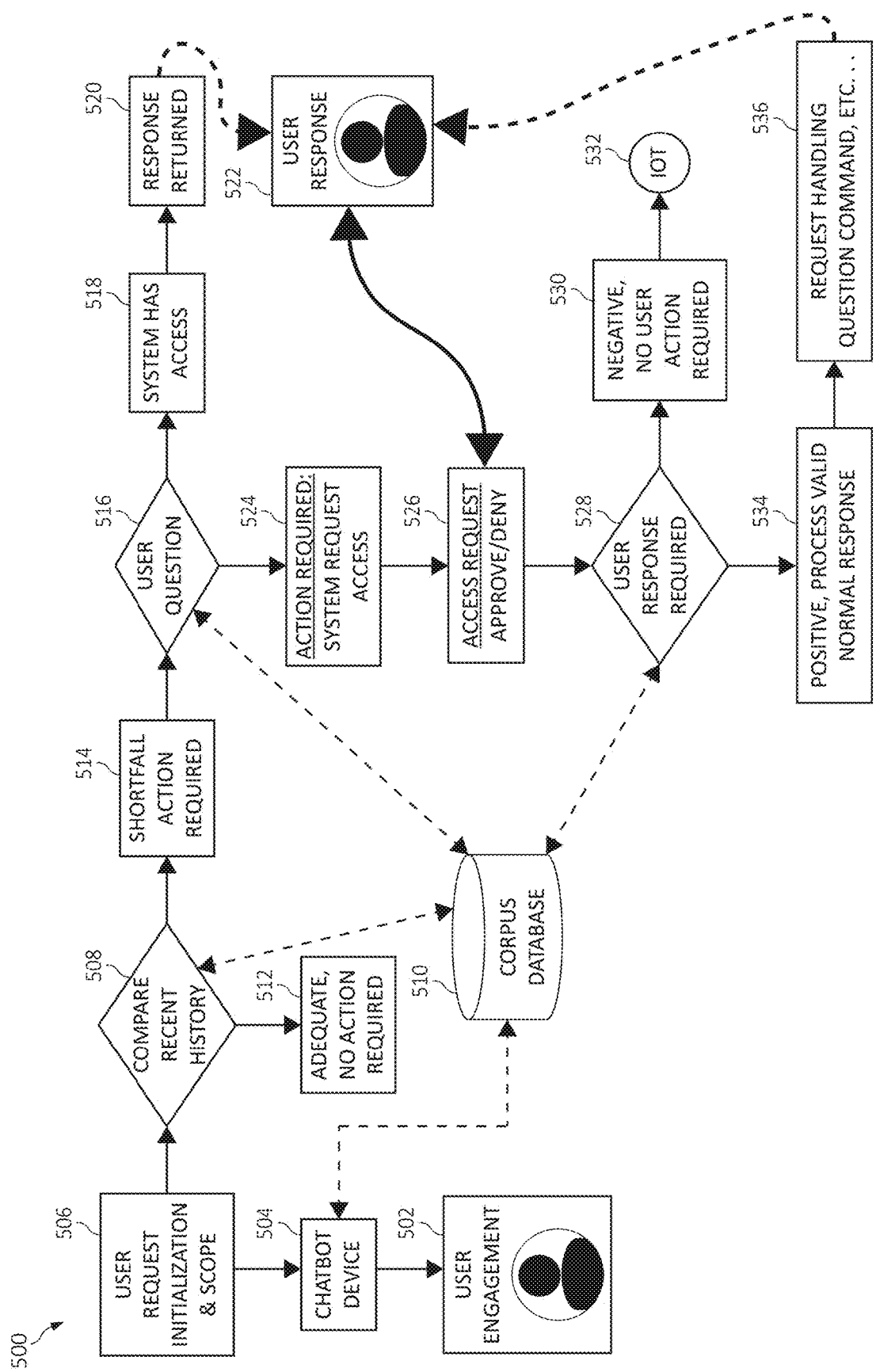
FIG. 5 is a flow chart/block diagram of exemplary method and/or system for managing chatbots according to an embodiment of the present invention.

FIG. 5 illustrates a method (and/or system) 500 for managing a chatbot according to some embodiments described herein. At block 502, a communication or message (e.g., audible or text-based) is generated by a user. At block 504, the communication is received by a chatbot (e.g., via a computing device, perhaps using a microphone).

At blocks 506 and 508, the chatbot (and/or associated computing system) initializes the process of analyzing the scope of the communication and compares it to recently received messages from the user and/or establishes (and/or begins to maintain and/or updates) a "corpus" database 510.

The database 510 may be remote (e.g., on the cloud) and include a knowledge base to analyze various communications and/or problems/questions expressed therein or associated therewith, as well as logs/images from various devices. By analyzing the user's question (or statement, request, etc.), such as via NLP and/or a MFCC algorithm, and the user's historical behavior of such, such as via a recurrent neural network (RNN), the chatbot may determine whether or not the information provided by the user (and/or otherwise accessible by the chatbot) is sufficient and/or whether or not the chatbot is able to understand (or process) the question. If the chatbot determines that it has sufficient information (and/or access thereto) and/or that the question expressed by the user is clear, at block 512, the chatbot may generate a response (and/or answer) without requesting additional information and/or access to other data sources from the user.

If the chatbot determines that the communication is not clear and/or additional information is needed, at block 514, the chatbot determines that there is a shortfall (or "information gap") in the current information and/or received communication. The chatbot may then analyze the received communication using, for example, semantic and/or syntactic analysis to determine the additional information that is needed (or at least desirable) to analyze the problem. For example, with respect to the air conditioning example described above, the chatbot may identify the possible problems and/or causes that may lead to such performance of an air conditioning unit.

At block 516, perhaps using data within the corpus database 510, the chatbot identifies the (additional) information is that required to generate a suitable response to the user's communication (or what information is required to be analyzed) and/or the devices associated with the user that may have such information stored thereon.

At block 518, if the chatbot already has sufficient access to the required information and/or devices (or data sources), the chatbot may retrieve and analyze the data, and generate a suitable response. At block 520, the generated response to sent (or returned) to the user, where it is retrieved and/or again replied to by the user at block 522.

At block 524, if the chatbot does not have sufficient access to the required information and/or devices, the chat generates a request for authorization to access the required information and/or devices. In some embodiments, the chatbot (or another computing system) may calculate a confidence factor associated with its responses to relatively detailed and/or complex questions (or other communications) so that a user may understand the likelihood of an accurate/suitable answer being provided. If some of the information required by the chatbot is not accessible (and/or access thereto is denied), the chatbot may provide the user with the best answer possible given the accessible information and indicate the associated confidence factor, as well as one or more possible answers that could be verified is the requested authorization is granted. The user may then determine whether or not they want to provide the authorization (e.g., to improve the confidence factor by a particular amount, percentage, etc.).

At block 526, the request is provided (or sent) to the user and the user responds by (perhaps selectively) authorizing and/or denying the access. As described above, in some embodiments, the chatbot generates a communication that indicates the devices (or data sources) to which access is requested and perhaps the information (or types of information) that is required from the different devices. The communication (as well as another other communications described herein) may be relayed to and/or displayed by the user's computing device (e.g., a mobile phone, tablet, etc.) via, for example, Message Queuing Telemetry Transport (MQTT) protocol, or any other suitable protocol/method.

At block 528, it is determined whether or not an additional user response (or action) is required (e.g., to access particular types of information associated with IoT devices). At block 530, if no such additional required, the chatbot (or associated computing system) accesses the appropriate device(s) (e.g., IoT device(s)) and/or information, which is then used to generate a suitable (or the best) response to the user's initial communication. At block 534, if an additional user response/action is required, an appropriate request is generated at block 536 and sent to/received by the user at block 522. The method may then return to block 526 to obtain the additional user response/action (e.g., authorization).

In some embodiments, if the chatbot requires additional information and/or requests information from a device (or data source), access to which was not previously approved, the affected device(s) (or another computing system) may generate and provide a notification of such to the user. The user may then approve/deny the access in a manner similar to that described above.

Figure 6:
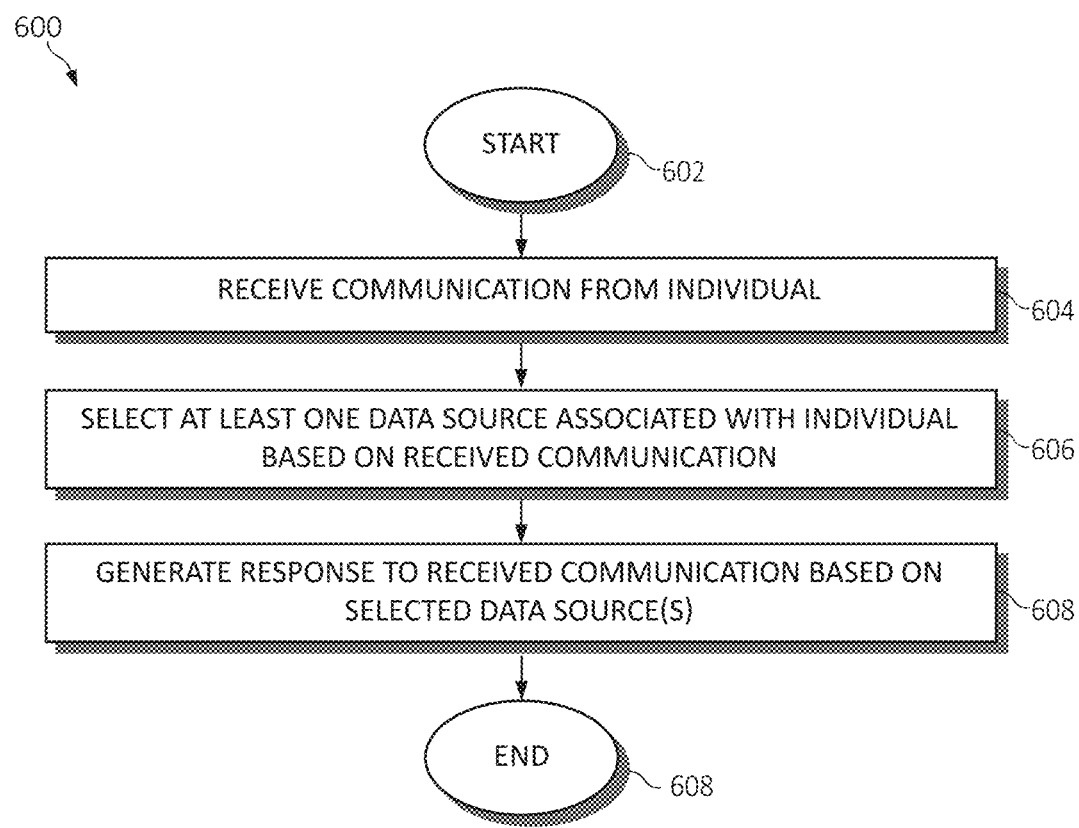
FIG. 6 is a flowchart diagram of an exemplary method for managing chatbots according to an embodiment of the present invention.

Turning to FIG. 6, a flowchart diagram of an exemplary method 600 for managing (or controlling) chatbots (and/or the operation thereof), in accordance with various aspects of the present invention, is provided. Method 600 begins (step 602) with, for example, a chatbot being installed (or otherwise implemented) on or through a computing system/device/node, such as a mobile electronic device (e.g., a mobile phone, tablet device, etc.).

A communication from an individual is received (or detected) (step 604). The received communication may be (or include) at least one of a voice communication (e.g., detected by a microphone) or a text-based communication (e.g., a text message composed via a keyboard, voice-to-text. etc.). The received communication may include a query (or question) or other type of statement/clause/phrase, such as a request, command, statement, etc.

At least one data source associated with the individual is selected based on the received communication (step 606). The selecting of the at least one data source (and/or the generating of the response described below) may be performed utilizing an analysis of the received communication. The analysis may be performed utilizing at least one of natural language processing (NLP) and a Mel-frequency cepstral coefficient (MFCC) algorithm. The at least one selected data source may include at least one computing node associated with the individual (e.g., an IoT device).

A response to the received communication (and/or a signal representative thereof) is generated based on the at least one selected data source (step 608). The generated response may be indicative of at least one of a request for authorization to access the at least one selected data source and a request for information associated with the received communication. If the generated response is indicative of at least one of a request for authorization to access the at least one selected data source, an indication of an authorization from the individual to access the at least one selected data source may be received, the at least one selected data source may be analyzed based on the received communication, and a second response to the received communication may be generated based on the analysis of the at least one selected data source.

Method 600 ends (step 610) with, for example, the generated response being provided (or sent) to the user and/or rendered by a computing device (e.g., a mobile phone) utilized by the user. If additional authorization for access to other devices and/or types of information is required, additional responses/communications may be sent to the user. The process may be repeated when a subsequent communication is received. In some embodiments, the user(s) may provide feedback related to the management of the chatbot, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a chatbot comprising:
receiving a communication having a first intent from an individual by a first physical device implementing the chatbot;
responsive to receiving and analyzing the communication, selecting at least one data source associated with the individual upon determining the chatbot will provide a more accurate response to the communication, according to the first intent, using information obtained from the at least one data source of which the first physical device implementing the chatbot does not currently possess, wherein the at least one data source includes a second physical Internet of Things (IoT) device having the information associated with the first intent of the communication;
generating, by the chatbot, a response to the received communication based on the at least one selected data source, wherein the generated response is indicative of a request for authorization to access the second physical IoT device by the first physical device, and wherein the request for authorization further includes a specification, by the chatbot, of which portions and types of data will be collected when accessing the second physical IoT device;
receiving a second communication, by the chatbot, from the individual comprising an indication of authorization for the first physical device to access the second physical IoT device, wherein the indication of authorization is inclusive of a specification, by the user, selectively approving or disapproving which of the portions and types of data are authorized to be collected;
responsive to receiving the second communication comprising the indication of authorization by the individual, and responsive to determining the information may be retrieved by accessing those of the portions and types of data authorized to be collected, establishing a connection between the first physical device and the second physical IoT device;
responsive to establishing the connection, querying the second physical IoT device for the information from the first physical device, and receiving the information by the chatbot of the first physical device from the second physical IoT device; and
generating, by the chatbot, a second response to the communication that resolves the first intent of the individual based on the information received from the second physical IoT device.

2. The method of claim 1, wherein the received communication is at least one of a voice communication or a text-based communication.

3. The method of claim 1, wherein at least one of the selecting of the at least one data source and the generating of the response is performed utilizing an analysis of the received communication, wherein the analysis is performed utilizing at least one of natural language processing (NLP) and a Mel-frequency cepstral coefficients (MFCC) algorithm.

4. The method of claim 1, wherein the received communication includes a query.

5. A system for managing a chatbot comprising:
a first physical device implementing the chatbot;
a second physical Internet of Things (IoT) device; and
at least one processor associated with at least one of the first physical device and the second physical IoT device that
receives a communication having a first intent from an individual by the first physical device implementing the chatbot;
responsive to receiving and analyzing the communication, selects at least one data source associated with the individual upon determining the chatbot will provide a more accurate response to the communication, according to the first intent, using information obtained from the at least one data source of which the first physical device implementing the chatbot does not currently possess, wherein the at least one data source includes a second physical Internet of Things (IoT) device having the information associated with the first intent of the communication;
generates, by the chatbot, a response to the received communication based on the at least one selected data source, wherein the generated response is indicative of a request for authorization to access the second physical IoT device by the first physical device, and wherein the request for authorization further includes a specification, by the chatbot, of which portions and types of data will be collected when accessing the second physical IoT device;
receives a second communication, by the chatbot, from the individual comprising an indication of authorization for the first physical device to access the second physical IoT device, wherein the indication of authorization is inclusive of a specification, by the user, selectively approving or disapproving which of the portions and types of data are authorized to be collected;
responsive to receiving the second communication comprising the indication of authorization by the individual, and responsive to determining the information may be retrieved by accessing those of the portions and types of data authorized to be collected, establishes a connection between the first physical device and the second physical IoT device;
responsive to establishing the connection, queries the second physical IoT device for the information from the first physical device, and receives the information by the chatbot of the first device from the IoT device; and
generates, by the chatbot, a second response to the communication that resolves the first intent of the individual based on the information received from the second physical IoT device.

6. The system of claim 5, wherein the received communication is at least one of a voice communication or a text-based communication.

7. The system of claim 5, wherein at least one of the selecting of the at least one data source and the generating of the response is performed utilizing an analysis of the received communication, wherein the analysis is performed utilizing at least one of natural language processing (NLP) and a Mel-frequency cepstral coefficients (MFCC) algorithm.

8. The system of claim 5, wherein the received communication includes a query.

9. A computer program product for managing a chatbot by one or more processors, the computer program product comprising a non-transitory computer-readable storage medium having computer-readable program code portions stored therein, the computer-readable program code portions comprising:

an executable portion that receives and analyzes a communication having a first intent from an individual by a first physical device implementing the chatbot;

an executable portion that, responsive to receiving and analyzing the communication, selects at least one data source associated with the individual upon determining the chatbot will provide a more accurate response to the communication, according to the first intent, using information obtained from the at least one data source of which the first physical device implementing the chatbot does not currently possess, wherein the at least one data source includes a second physical Internet of Things (IoT) device having the information associated with the first intent of the communication;

an executable portion that generates, by the chatbot, a response to the received communication based on the selected at least one selected data source, wherein the generated response is indicative of a request for authorization to access the second physical IoT device by the first physical device, and wherein the request for authorization further includes a specification, by the chatbot, of which portions and types of data will be collected when accessing the second physical IoT device;

an executable portion that receives a second communication, by the chatbot, from the individual comprising an indication of authorization for the first physical device to access the second physical IoT device, wherein the indication of authorization is inclusive of a specification, by the user, selectively approving or disapproving which of the portions and types of data are authorized to be collected;

an executable portion that, responsive to receiving the second communication comprising the indication of authorization by the individual, and responsive to determining the information may be retrieved by accessing those of the portions and types of data authorized to be collected, establishes a connection between the first physical device and the second physical IoT device;

an executable portion that, responsive to establishing the connection, queries the second physical IoT device for the information from the first physical device, and receives the information by the chatbot of the first device from the IoT device; and an executable portion that generates, by the chatbot, a second response to the communication that resolves the first intent of the individual based on the information received from the second physical IoT device.

10. The computer program product of claim 9, wherein the received communication is at least one of a voice communication or a text-based communication.

11. The computer program product of claim 9, wherein at least one of the selecting of the at least one data source and the generating of the response is performed utilizing an analysis of the received communication, wherein the analysis is performed utilizing at least one of natural language processing (NLP) and a Mel-frequency cepstral coefficients (MFCC) algorithm.

12. The computer program product of claim 9, wherein the received communication includes a query.

* * * * *